(12) United States Patent
Jenks

(10) Patent No.: US 10,480,398 B2
(45) Date of Patent: Nov. 19, 2019

(54) CONTROLLING TURBOCHARGER COMPRESSOR CHOKE

(71) Applicant: BorgWarner Inc., Auburn Hills, MI (US)

(72) Inventor: Gordon Jenks, Hendersonville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 592 days.

(21) Appl. No.: 15/023,096

(22) PCT Filed: Sep. 25, 2014

(86) PCT No.: PCT/US2014/057369
§ 371 (c)(1),
(2) Date: Mar. 18, 2016

(87) PCT Pub. No.: WO2015/048231
PCT Pub. Date: Apr. 2, 2015

(65) Prior Publication Data
US 2016/0230651 A1 Aug. 11, 2016

Related U.S. Application Data

(60) Provisional application No. 61/884,309, filed on Sep. 30, 2013.

(51) Int. Cl.
*F02B 37/24* (2006.01)
*F01D 17/14* (2006.01)
(Continued)

(52) U.S. Cl.
CPC ............ *F02B 37/24* (2013.01); *F01D 17/146* (2013.01); *F04D 29/422* (2013.01); *F04D 29/464* (2013.01); *Y02T 10/144* (2013.01)

(58) Field of Classification Search
CPC ........ F02B 37/22; F02B 37/24; F02B 37/225; F01D 17/146; F04D 29/422; F04D 29/464
(Continued)

(56) References Cited

U.S. PATENT DOCUMENTS 3,398,882 A * 8/1968 Zenkner .................. F04D 17/04
 415/53.1
3,684,396 A * 8/1972 Ball ....................... F04D 29/422
 415/144
(Continued)

FOREIGN PATENT DOCUMENTS

EP 0138480 A2 4/1985

OTHER PUBLICATIONS

International Search Report dated Jan. 14, 2015, in International Application No. PCT/US2014/057369.

*Primary Examiner* — Timothy L Maust
(74) *Attorney, Agent, or Firm* — Eric L. Doyle; Stephan A. Pendorf; Patent Central LLC

(57) ABSTRACT

A radial flow compressor includes a device (1, 34) for controlling air flow detachment from the volute tongue (3). The device (1, 34) may include a vane (1) or hole (34) in the tongue (3), and serves to redirect air over the volute tongue (3). The device (1, 34) aids in decreasing the velocity of air flow at the volute tongue (3), diminishes the vortices that develop at the volute tongue (3) from the high air velocities, and redirects air over the volute tongue (3) allowing the air to flow through the narrow passage and attach to the walls of the volute outlet (6).

7 Claims, 2 Drawing Sheets

(51) Int. Cl.
   *F04D 29/42*      (2006.01)
   *F04D 29/46*      (2006.01)
(58) Field of Classification Search
   USPC .................................................. 415/115, 206
   See application file for complete search history.

(56) References Cited

U.S. PATENT DOCUMENTS

| | | | | |
|---|---|---|---|---|
| 4,799,856 | A | * | 1/1989 | Matsudaira ........... F01D 17/146 |
| | | | | 415/155 |
| 5,165,849 | A | * | 11/1992 | Nakagawa ............ F04D 29/462 |
| | | | | 415/148 |
| 5,286,162 | A | | 2/1994 | Veres |
| 5,310,309 | A | * | 5/1994 | Terasaki ................ F04D 29/444 |
| | | | | 415/208.3 |
| 6,379,110 | B1 | * | 4/2002 | McCormick ............ B64C 23/00 |
| | | | | 415/115 |
| 2004/0165984 | A1 | * | 8/2004 | Ochiai .................. F01D 17/143 |
| | | | | 415/206 |
| 2005/0152775 | A1 | | 7/2005 | Japikse et al. |
| 2010/0266390 | A1 | | 10/2010 | Henderson |
| 2011/0255953 | A1 | | 10/2011 | Smeulers |

* cited by examiner

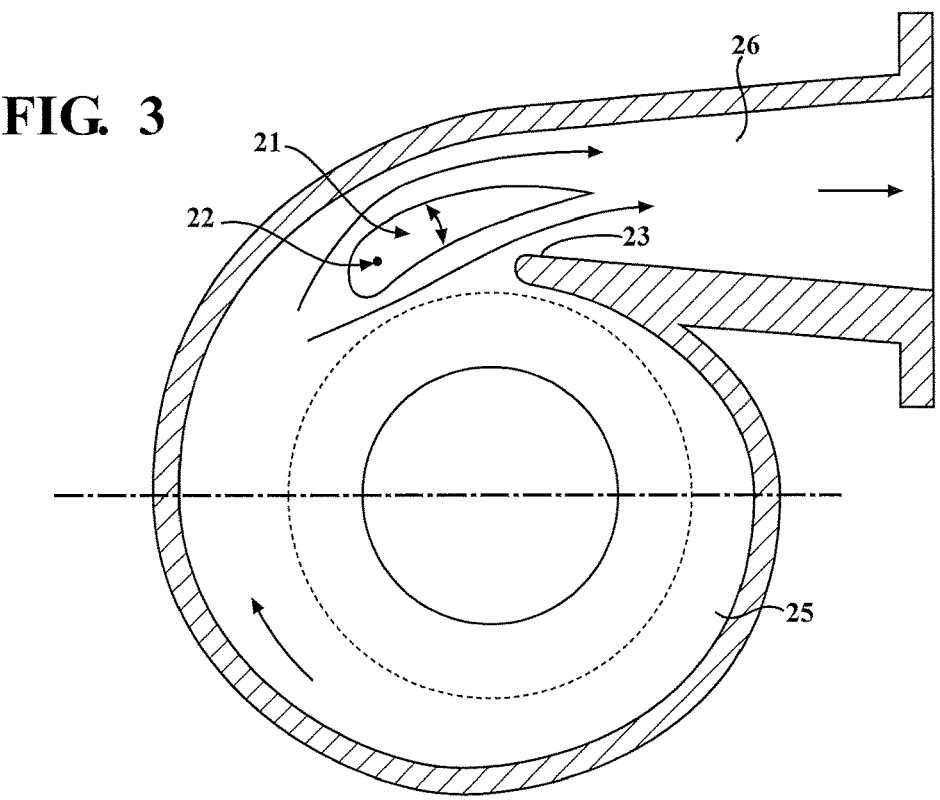
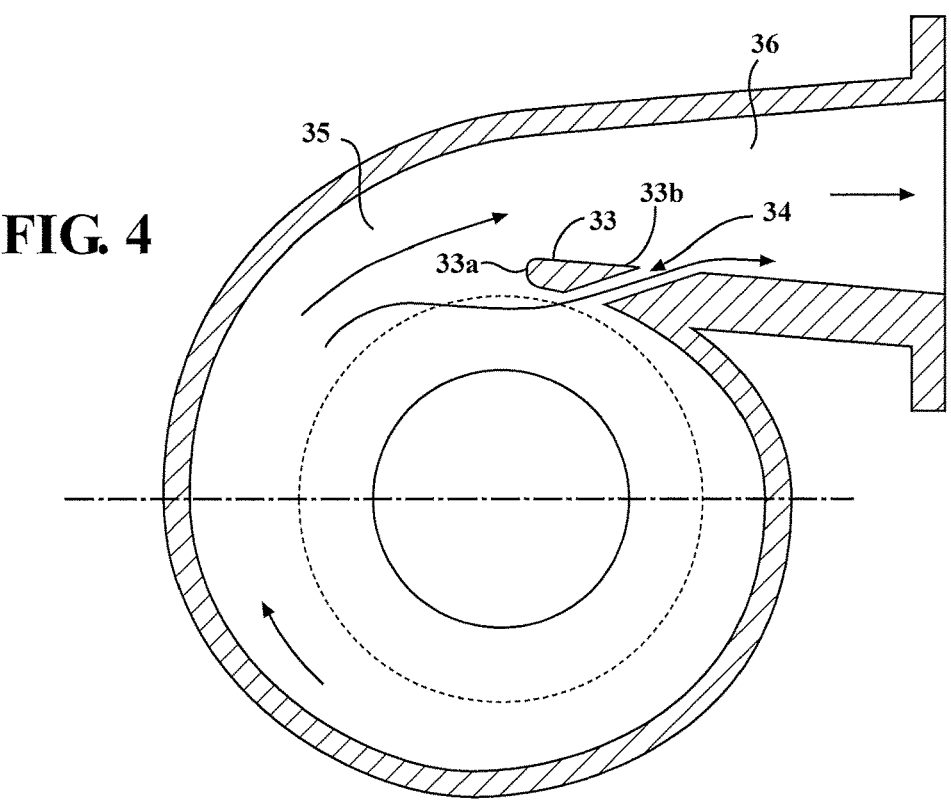

CONTROLLING TURBOCHARGER COMPRESSOR CHOKE

CROSS-REFERENCE TO RELATED APPLICATION

This application claims priority to and all the benefits of U.S. Provisional Application No. 61/884,309, filed on Sep. 30, 2013, and entitled "Controlling Turbocharger Compressor Choke," which is incorporated herein by reference.

BACKGROUND

1. Field of the Disclosure

The disclosure relates to a turbocharger for an internal combustion engine. More particularly, the disclosure relates to a means for controlling choke in a turbocharger having a radial flow compressor.

2. Description of Related Art

A turbocharger is a type of forced induction system used with internal combustion engines. Turbochargers deliver compressed air to an engine intake, allowing more fuel to be combusted, thus boosting the horsepower of the engine without significantly increasing engine weight. Turbochargers permit the use of smaller engines that develop the same amount of horsepower as larger, normally aspirated engines. Using a smaller engine in a vehicle has the desired effect of decreasing the mass of the vehicle, increasing performance, and enhancing fuel economy. Moreover, the use of turbochargers permits more complete combustion of the fuel delivered to the engine, which contributes to the highly desirable goal of a cleaner environment.

Turbochargers typically include a turbine housing connected to the exhaust manifold of the engine, a compressor housing connected to the intake manifold of the engine, and a center bearing housing coupling the turbine and compressor housings together. A turbine wheel in the turbine housing is rotatably driven by an inflow of exhaust gas supplied from the exhaust manifold. A shaft rotatably supported in the center bearing housing connects the turbine wheel to a compressor impeller in the compressor housing so that rotation of the turbine wheel causes rotation of the compressor impeller. The shaft connecting the turbine wheel and the compressor impeller defines an axis of rotation. As the compressor impeller rotates, it increases the air mass flow rate, airflow density and air pressure delivered to the cylinders of the engine via the intake manifold.

The turbine wheel of a turbocharger rotates very rapidly. The rotational speed of a turbine wheel is size dependent, and smaller turbine wheels can rotate faster than larger wheels. A turbocharger turbine wheel used in conjunction with an internal combustion engine may reach circumferential tip speeds of 530 meters per second. The rapid rotation of the turbine wheel is directly transmitted to the compressor wheel which likewise rotates extremely rapidly. Accordingly, the gas coming off the compressor wheel is moving at a high velocity.

Once the air is accelerated by the compressor wheel and prior to being exhausted at the compressor exit, the air proceeds through a diffuser and into a volute formed in the turbocharger housing. The passageway from the compressor wheel into the volute is extremely narrow. The high velocity air is not capable of flowing through the narrow passage. The diffuser slows down the high-velocity air, largely without losses, so that both pressure and temperature are able to rise. The diffuser accomplishes this increase by essentially forcing the air from the compressor wheel to pass through the narrow passageway.

The mass flow of air through the compressor of a turbocharger increases up to a certain point at which the turbocharger compressor becomes so inefficient that the turbocharger chokes, or is unable to move more air. One of the causes of compressor choke is that at high mass flow rates the angle of attack of the flow of air upon the volute tongue becomes quite large which generates vortices and the air flow detaches from the volute tongue. The detached flow at the volute tongue restricts air flow from the compressor and can diminish the efficiency of the turbocharger.

SUMMARY

A device for controlling choke in a turbocharger having a radial flow compressor is provided including a compressor volute having a device that controls air flow detachment from the volute tongue by redirecting air over the tongue of the volute.

In some aspects, a fixed vane is disposed in close proximity to the tongue to redirect the flow of air over the tongue. Positioning a vane close to the tongue controls air flow detachment from the suction side of the volute tongue and prevents choke or detachment of the air flow by redirecting the air flow over the tongue so that the air is able to attach to the walls of the volute outlet and improve efficiency. The fixed vane may optionally be free-floating and movable. Alternatively, the vane could be moved by an actuator. In some embodiments, the vane has a proper airfoil shape, whereby the motion of the air can cause the vane to tilt toward the tongue and redirect air over the tongue.

In some aspects, a hole may be drilled or cast into the volute tongue. The hole permits the pressures on the both sides of the tongue to equalize, promoting flow attachment of the flowing air over the suction side of the volute tongue.

In some aspects, a turbocharger comprising a radial compressor includes a compressor wheel and a compressor volute. The compressor volute has a volute tongue disposed therein, and a redirecting device configured to redirect air over a suction side of the volute tongue.

The turbocharger may include one or more of the following features: The redirecting device comprises a vane. The vane is fixed relative to the volute. The vane is a passive, free-floating vane. The vane is movable relative to the volute. The redirecting device comprises a hole formed through the volute tongue. The compressor volute includes a stop mechanism that is configured govern the movement of the passive/free-floating vane relative to the volute. The position of the moveable vane is controlled by an actuator. The hole formed through the volute tongue is formed at an angle relative to a surface of the volute tongue. The hole formed through the volute tongue is angled in the direction of air flow through the compressor volute outlet.

BRIEF DESCRIPTION OF THE DRAWINGS

Advantages of the disclosure will be readily appreciated as the same becomes better understood by reference to the following detailed description when considered in connection with the accompanying drawings wherein:

FIG. 3 is a detailed view of a turbocharger compressor volute having a movable vane moved by an actuator; and FIG. 4 is a detailed view of a turbocharger compressor volute having a hole formed through the tongue.

DETAILED DESCRIPTION OF THE EMBODIMENTS

The disclosure relates to a compressor volute 5 having a means of controlling air flow detachment from the volute tongue 3 by redirecting air over the volute tongue 3. Air is accelerated from the compressor wheel at an extremely high velocity and thus tends to detach from volute surfaces when flowing through the narrow passage into the volute outlet 6. The means for controlling air flow detachment from the volute tongue 3 aids in decreasing the velocity of air flow at the volute tongue 3, diminishes the vortices that develop at the volute tongue 3 from the high air velocities, and redirects air over the volute tongue 3 allowing the air to flow through the narrow passage and remain attached to the walls of the volute outlet 6.

Figure 1:
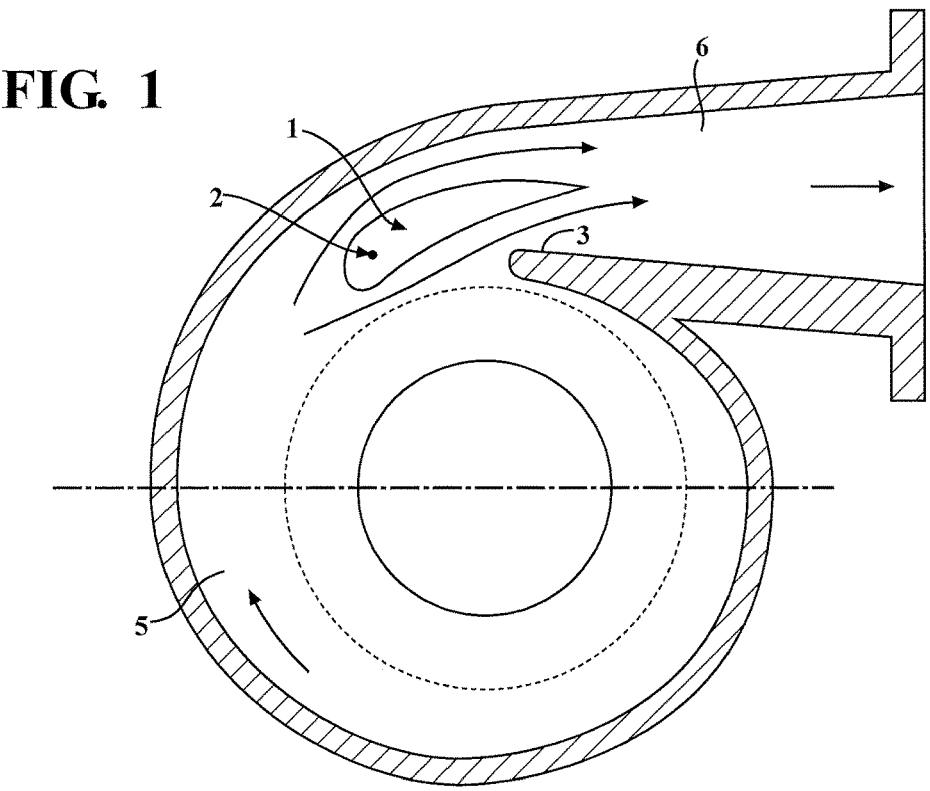
FIG. 1 is a cross-sectional view of a turbocharger compressor volute having a fixed vane.

FIG. 1 details a turbocharger compressor volute 5 having a fixed vane 1. The vane 1 is mounted on a shaft 2 and directs air over the suction side of the volute tongue 3 and into the volute outlet 6. Although illustrated here as having an airfoil shape, the shape of the vane 1 is not particularly critical, as long as the vane 1 directs air over the volute tongue 3 such that the tendency of the turbocharger compressor to choke is controlled. While a shaft 2 is detailed for mounting the vane 1, it is contemplated that the vane 1 can be formed as a portion of the volute 10 or attached thereto by any means suitable.

Figure 2:
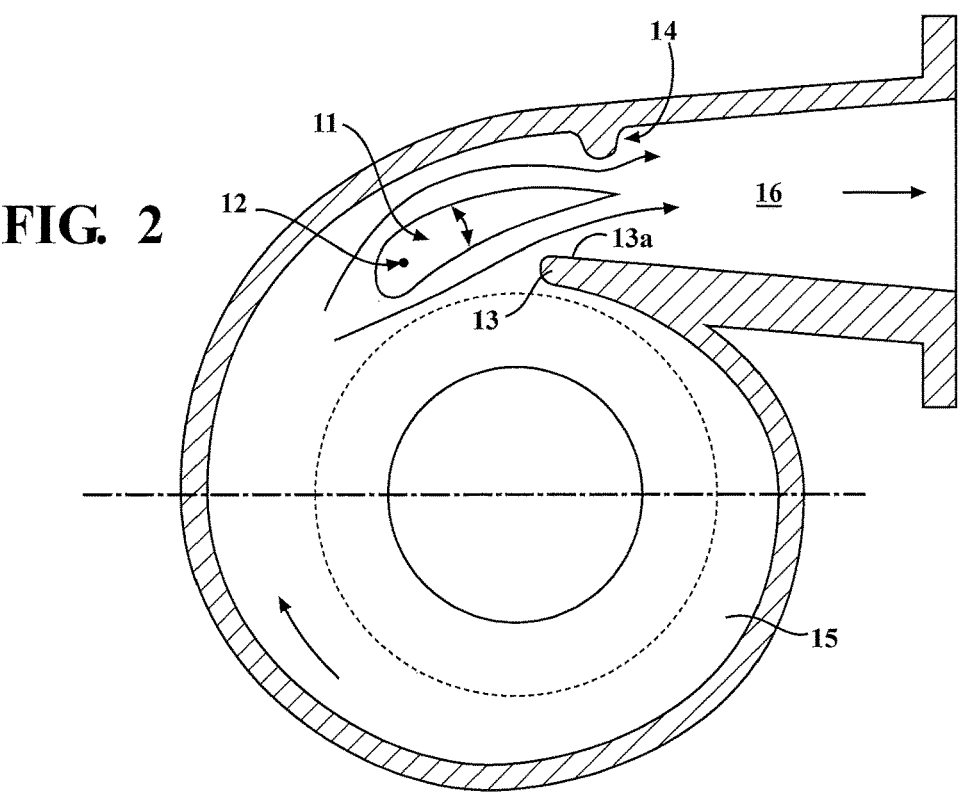
FIG. 2 is a detailed view of a turbocharger compressor volute having a passive/free-floating movable vane.

A turbocharger compressor volute having a passive, free-floating movable vane 11 is detailed in FIG. 2. The vane 11 is mounted on a shaft 12 and pivots in response to the flow of air over the vane 11. As the vane 11 pivots, it directs air over the suction side 13a of the volute tongue 13. The passive, free-floating vane 11 has an airfoil shape so that the motion of air creates a force which causes the passive, free-floating vane 11 to pivot on the shaft 12. The passive, free-floating vane 11 can pivot on a fixed shaft 12 or the passive/free-floating vane 11 can be fixed to shaft 12. The passive, free-floating vane 11 is mounted off center so that the force on the vane 11 created by the air moving over the vane 11 causes the passive, free-floating vane 11 to pivot and direct air toward the volute tongue 13. The higher the mass flow of air, the greater the force of air on the vane 11 and the more air that is directed toward the volute tongue 13. The motion of the vane 11 should be controlled so that the vane 11 does not pivot too far into the volute passageway and interfere with air flow. As such, the passive/free-floating movable vane 11 may also include a stop 14 which can be a cast feature in the volute passage, set screw, or other similar vane stop device known in the art. The pressure difference between the inside of the volute 15 and the volute outlet 16 are minimal. Hence, the vane 11 is moved according to the pressure differences along the airfoil surfaces of the vane 11 due to air flow over these surfaces. The stop 14 prevents the vane 11 from freely moving beyond a region of allowing the air flow to be directed over the volute tongue 13.

FIG. 3 details a turbocharger compressor volute having a movable vane 21 that is not free-floating, but is moved and controlled by an actuator (not shown). The vane 21 is mounted on a shaft 22 and pivots in response to the actuator. As the vane 21 pivots it directs air over the volute tongue 23. Vane 21 acts similarly to vane 11 shown in FIG. 2 except there is no stop mechanism 14 and the vane 21 movement is controlled by the actuator. The actuator allows for movement of the vane 21 in response to detection of pressure differences between the inside and outside of the volute passage. The pressure differences may be detected by the use of a sensoring mechanism (not shown), or other sensing mechanisms well known in the art, and operates similarly to that of a wastegate where the pressure differences between the inside and outside of the volute passage causes the actuator (not shown) to move the vane 21 allowing the air flow to be directed over the volute tongue 23 and into the volute outlet 26. Again, the shape of the vane 21 is not particularly critical, as long as the vane 21 directs air over the volute tongue 23 controlling the tendency of the turbocharger compressor to choke.

A turbocharger compressor volute having a hole 34 formed through the volute tongue 33 is detailed in FIG. 4. According to this particular aspect of the invention, the hole 34 is formed therethrough approximate a leading edge 33a of the volute tongue 33, proving a fluid path that connects the volute 35 with the volute outlet and bypasses the tongue leading edge 33a. The size of the hole 34 depends upon the volume output of the turbocharger. The higher the volume output of the turbocharger, the larger the hole 34 will need to be in order to supply the amount of air that will be required to restore proper flow to the volute tongue 33. The volume of air actually moving through the hole 34 depends upon the operation of the turbocharger. When the turbocharger is operating far from choke, there will be high pressure air at the volute tongue 33, and consequently little air will move through the hole 34. However, when the turbocharger is operating closer to choke, there is lower pressure at the volute tongue 33 and the pressurized air is drawn away from the volute tongue 33. This low pressure zone at the volute tongue 33 draws air through the hole 34 into the volute outlet 36. When air moves through the hole 34, the hole 34 acts in the same manner as a diffuser. The high velocity normal pressure air is slowed down and increases in temperature and pressure. Accordingly, the air coming through the hole 34 does not disturb the flow of air in the volute 35, controlling choke and turbocharger efficiency. The hole 34 can be angled relative to a surface 33b of the tongue 33. The direction and/or degree of inclination of the angle is selected depending upon the desired turbocharger operating conditions and may vary from turbocharger to turbocharger. In a preferred aspect, and more particularly when there is a high mass flow of air, the hole 34 can be angled in the direction of flow toward the volute outlet 36.

Aspects of the disclosure have been described herein in an illustrative manner, and it is to be understood that the terminology used is intended to be in the nature of words of description rather than limitation. Many modifications and variations of the present disclosure are possible in light of the above teachings. It is, therefore, to be understood that within the scope of the appended claims, the invention may be practiced other than as specifically enumerated within the description.

What is claimed:

1. A turbocharger comprising a radial compressor including a compressor wheel, a diffuser and a compressor volute (5), the compressor volute (5) having a compressor volute tongue (3) disposed therein, and a redirecting device in the form of a vane (1) in a volute outlet upstream of the compressor volute tongue (3) and configured to redirect air over a suction side of the compressor volute tongue (3).

2. The turbocharger according to claim 1 wherein the vane (1) is fixed relative to the compressor volute (5).

3. The turbocharger according to claim 1 wherein the vane (1) is a passive, free-floating vane.

4. The turbocharger according to claim 1 wherein the vane (1) is movable relative to the compressor volute (5).

5. The turbocharger according to claim 3 wherein the compressor volute (5, 15) includes a stop mechanism (14) that is configured to govern the movement of the vane (1, 11) relative to the compressor volute (5, 15).

6. The turbocharger according to claim 4 wherein the position of the moveable vane (1) is controlled by an actuator.

7. A turbocharger comprising a radial outflow compressor including
- a compressor wheel,
- a diffuser,
- a compressor volute (5),
- a compressor outlet (6),
- a compressor tongue (3) between the compressor volute (5) and compressor outlet (6), the volute tongue (3) having a volute side and a compressor outlet side, and
- a redirecting device (1, 34) in the compressor volute (5) for controlling choke at the outlet side of the volute tongue (3) by controlling air flow detachment from the volute tongue (3) by redirecting air flow onto the compressor outlet side of the compressor volute tongue (3).

* * * * *